3,332,888
HARDENABLE CASTING RESINS OF TRIEPOXY-CYCLODODECANE COMPOSITIONS
Franz Steden, Mannheim, and Ferdinand Meyer, Ziegelhausen, Germany, assignors to Badische Anilin- & Soda-Fabrik Aktiengesellschaft, Ludwigshafen (Rhine), Germany
No Drawing. Filed Feb. 21, 1962, Ser. No. 174,721
Claims priority, application Germany, Feb. 22, 1961, B 61,386
2 Claims. (Cl. 260—2)

The present invention relates to hardening casting resins based on mixtures which contain:

(1) compounds with more than one epoxy group and
(2) curing agents for compounds with more than one epoxy group, but do not contain, or contain only small amounts of from 0.01 up to 20% by weight of inert liquid substances.

Examples of such hardening casting resins, which are well known as epoxide casting resins, are mixtures of (1) di-, tri- or tetraglycidyl ethers of di-, tri- or tetrahydroxy compounds, such as ethylene glycol, glycerin or pentaerythritol and (2) acid reacting or basic reacting organic compounds such as 1,4-benzenedicarboxylic acid or 1,4-diaminobenzene.

The object of the present invention is to provide improved hardening casting resins based on mixtures which contain (1) compounds having more than one epoxy group and (2) curing agents for compounds having more than one epoxy group, but which do not contain, or contain only small amounts of from 0.01 up to 20% by weight of, inert liquid substances.

The object is achieved according to this invention by including 1,2-5,6-9,10-triepoxycyclododecane as the sole compound (1) having more than one epoxy group or together with other compounds having more than one epoxy group in the hardening casting resin.

The improvement to be achieved by the present invention mainly residues in the fact that the hardening casting resins according to this invention make it possible to manufacture cured articles with increased heat resistance.

Hardening casting resins according to this invention contain as curing agents the conventional and well known curing agents (2) for compounds having more than one epoxy group. These curing agents do not form part of the subject-matter of the present invention.

1,2-5,6-9,10-triepoxycyclododecane may be prepared by reaction of cyclododecatriene-(1,5,9) with peroxy acids or other peroxy compounds. It is advantageous to use at least one mole of peroxy compound for each double bond of the triene. Epoxidation may be effected in an inert organic solvent, such as methylene chloride, chloroform, benzene, toluene, acetone, methyl ethyl ketone or methyl acetate, at temperatures of $-20°$ to $+150°$ C. 1,2-5,6-9,10-triepoxycyclododecane has a melting point of $64.5°$ C. and a boilng point of $140°$ to $142°$ C. at 0.3 mm. mercury column.

Up to 95% by weight, but preferably not more than 50% by weight, of 1,2-5,6-9,10-triepoxycyclododecane may be replaced by other compounds having more than one epoxy group in the hardening casting resins according to this invention. Such other compounds include diglycidyl ethers, triglycidyl ethers, and tetraglycidyl ethers, of dihydroxy, trihydroxy or tetrahydroxy compounds, for example the reaction products of ethylene glycol, glycerin, pentaerythritol or 2,2-bis-(p-hydroxyphenyl)-propane and epichlorohydrin. 1,2-5,6-9,10-triepoxycyclododecane may also be partly replaced by compounds having more than one epoxy group but not containing any ether groups, for example by epoxyethyl-3,4-epoxycyclohexane or 1,2-5,6-diepoxycyclooctane.

Compounds having more than one epoxy group, by which a part of the 1,2-5,6-9,10-triepoxycyclododecane may be replaced, are described for example by A. M. Paquin in the book "Epoxydverbindungen und Epoxydharze," Springer Verlag Berlin, Gottingen, Heidelberg, 1958, especially on pages 325–330, 333–336 and 354–363, and by H. Lee and K. Neville in the book "Epoxy Resins, Their Applications and Technology," McGraw-Hill Book Company, Inc., New York, Toronto, London, 1957, especially on pages 10–20.

The curing agents (2) contained in the hardening casting resins according to this invention are the conventional curing agents for compounds having more than one epoxy group. Such curing agents are usually acid-reacting or basic reacting organic compounds such as dibasic or higher polybasic carboxylic acids, or their anhydrides, or diamines or higher polyamines. Examples are o-, m- and p-benzenedicaroboxylic acids, o-benzenedicarboxylic acid anhydride, maleic anhydride, 1,4-diaminobenzene and 4,4'-diamino-3,3'-dimethyldicyclohexylmethane.

Specific suitable curing agents are described for example A. M. Paquin (ibid.) especially on pages 473–508 and by H. Lee and K. Neville (ibid.) especially on pages 41–51 and 63–140.

To prepare hardening casting resins according to this invention, 1,2-5, 6-9,10-triepoxycyclododecane and the curing agent, or 1,2-5,6-9,10-triepoxycyclododecane, other compounds having more than one epoxy group and the curing agent may be mixed in a simple way at temperatures between $15°$ and $140°$ C., preferably between $15°$ and $70°$ C. The relative proportions of 1,2-5,6-9,10-triepoxycyclododecane, alone or with other compounds having more than one epoxy group, and the curing agent are usually chosen so that there are 0.7 to 1.1, preferably 0.8 to 1.0, mole equivalents of curing agent for each mole of epoxy groups (for determination of the equivalents see H. Lee and K. Neville (ibid.), pages 51–52.

Hardening casting resins according to this invention amy be cured in a simple way by heating to temperatures between $80°$ and $200°$ C.

The period and/or temperature required for curing may be lessened by adding small amounts of catalyst to the casting resins. Suitable catalysts are those conventional in curing epoxy casting resins, for example inorganic acid or basic substances, such as sulphuric acid, phosphoric acid, aluminum chloride, boron fluoride, iron chloride, zinc chloride, stannic chloride, sodium hydroxide, potassium hydroxide, quaternary ammonium compounds of boron fluoride amine complexes. The casting resins according to this invention should not contain, or should only contain small amounts of from 0.01 up to 20% by weight (with reference to the total casting resin) of inert liquid substances. It may, on the other hand, be of advantage for the casting resins to contain from 0.01 up to 30% by weight (with reference to the total amount of casting resin) of polymerizable liquid substances. Inert liquid substances, in the present context, are for example water, aqueous solutions, for example of simple alcohols or simple ketones, and also liquid hydrocarbons, simple alcohols, ketones and simple ethers. Polymerizable liquid substances include for example styrene or acrylic esters or methacrylic esters of monohydric lower aliphatic alcohols.

Casting resins according to this invention are suitable for example for the production of mouldings, laminations, coatings, varnishes and lacquers. Conventional additives, for example fillers, glass fibres and pigments, may also be coemployed.

The invention is illustrated by, but not limited to, the following examples in which parts are by weight. For the sake of brevity, 1,2-5,6-9,10-triepoxycyclododecane is referred to in the examples as TEC.

Example 1

7 parts of TEC is mixed with 3.2 parts of styrene. 8.9 parts of phthalic anhydride is added to the mixture at 80° to 120° C. The clear mixture is then poured into moulds and cured at temperatures between 120° and 180° C. for six hours. The product is light yellow in colour and has a softening point of 190° C.

If 0.05 part of potassium hydroxide be added to the hardenable mixture as catalyst, curing is complete within two hours under otherwise the same conditions. The properties of the resin thus obtained are similar to those of the product obtained without the catalyst.

Example 2

1.86 parts of TEC is mixed with 12.1 parts of a reaction product of pentaerythritol with epichlorohydrin (epoxy value 0.62), stirred at 40° to 60° C. with 6 parts of 4,4'-diamino - 3,3' - dimethyldicyclohexylmethane and poured into moulds. The mixture is cured after thirty minutes at room temperature. The resin is then after-annealed for an hour at 120° C.

A clear almost colourless moulding is obtained with a softening point of 130° C. Without the addition of TEC, the softening point is 105° to 110° C.

Example 3

1.86 parts of TEC is mixed with 12.1 parts of a reaction product of pentaerythritol with epichlorohydrin (epoxy value 0.62), stirred at 80° to 120° C. with 10.5 parts of phthalic anhydride and poured into moulds. Curing takes place at 120° to 150° C. for three hours.

Pale brown coloured, clear mouldings are obtained having a softening point of 155° C.

If 0.05 part of stannic chloride also be added to the hardenable mixture, it cures within one hour under otherwise the same conditions. The properties of the resin obtained in this way are similar to those of the product obtained without catalyst.

Example 4

5.3 parts of TEC is mixed with 5 parts of a reaction product of bisphenol-A and epichlorohydrin (epoxy value 0.5) and stirred at 100° C. to 120° C. with 10.5 parts of phthalic anhydride and poured into moulds. The mixture is cured after one hour at 120° C. It is then annealed for another hour at 180° C. Pale yellow mouldings are obtained with a softening point of 180° C.

Example 5

Mouldings having a softening point of 155° C. are obtained from 5.3 parts of TEC, 2.3 parts of glycol diglycidyl ether and 10.5 parts of phthalic anhydride by a method analogous to that of Example 4.

We claim:
1. A hardenable casting resin comprising a mixture of (1) 1,2-5,6-9,10-triepoxycyclododecane, and (2) a curing agent for compounds having more than one epoxy group, the ratio of the components of said mixture being such that 0.7 to 1.1 mol equivalents of curing agent are present for each mol oxirane group.

2. A hardenable casting resin as in claim 1 wherein from 0.01 to 30% by weight with reference to the total amount of casting resin of a liquid polymerizable ethylenically-unsaturated compound selected from the group consisting of styrene, acrylic esters of monohydric lower aliphatic alcohols and methacrylic esters of monohydric lower aliphatic alcohols is included in the mixture.

References Cited

UNITED STATES PATENTS

| | | | |
|---|---|---|---|
| 2,866,768 | 12/1958 | Bolstad | 260—47 |
| 2,924,580 | 2/1960 | Phillips et al. | 260—47 |
| 2,978,435 | 4/1961 | Ernst | 260—78.4 |
| 2,978,464 | 4/1961 | Weise et al. | 260—348 |
| 2,999,865 | 9/1961 | Phillips et al. | 260—2 |
| 3,080,341 | 3/1963 | Chenicek et al. | 260—2 |

WILLIAM H. SHORT, *Primary Examiner.*

J. R. LIEBERMAN, *Examiner.*

T. E. PERTILLA, T. D. KERWIN, *Assistant Examiners.*